United States Patent Office 3,842,054
Patented Oct. 15, 1974

3,842,054
VINYL-TYPE ADDITION POLYMERS CONTAINING A PLURALITY OF TERTIARY NITROGENS QUATERNIZED WITH AN EPIHALOHYDRIN
Gerald I. Keim, West Grove, Pa., assignor to Hercules Incorporated, Wilmington, Del.
No Drawing. Continuation-in-part of abandoned application Ser. No. 131,399, Apr. 5, 1971. This application Feb. 26, 1973, Ser. No. 335,626
Int. Cl. C08f 7/12, 15/02
U.S. Cl. 260—86.1 N        14 Claims

ABSTRACT OF THE DISCLOSURE

Disclosed are thermosettable water-soluble resinous materials containing a plurality of tertiary nitrogens quaternized with an epihalohydrin (such as epichlorohydrin). The resinous materials are derived by quaternizing, with an epihalohydrin, essentially all tertiary nitrogens of a polymer derived by the addition polymerization of an ester monomer of the formula

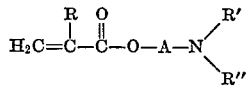

(such as dimethylaminoethylmethacrylate) alone or with at least one other monomer having the group $>C=C<$ capable of addition type polymerization (such as acrylamide). Quaternization is carried out in an aqueous medium at a pH of from about 7 to about 9.5. The resulting aqueous solutions of the resinous materials can be acid stabilized to prevent gelation thereof and subsequently reactivated by addition of a base such as sodium hydroxide. The reactivated resinous materials, in aqueous solution, are useful as wet-strength agents for paper toweling.

---

This application is a continuation-in-part of application Ser. No. 131,399, filed Apr. 5, 1971, now abandoned.

This invention relates to novel water-soluble resinous materials that are potentially thermosettable.

Particularly, the invention relates to water-soluble resinous materials containing a plurality of tertiary nitrogens quaternized with an epihalohydrin and which can be subsequently cured or crosslinked to a water-insoluable state by application of heat (thermoset).

The resinous materials of this invention can be used to impart wet-strength to paper; as flocculants; as shrink-resistant agents for wool; as paper creping aids; and as retention aids.

In preparing the novel water-soluble thermosettable resinous materials of this invention, there is first prepared an addition-type homopolymer or copolymer of an ester of the formula

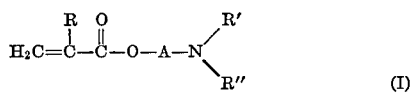  (I)

wherein R is hydrogen or methyl; R' is methyl or ethyl; R" is methyl or ethyl; and A is $C_2$-$C_6$ alkylene having at least 2 carbon atoms in a chain between the adjoined oxygen and nitrogen. Copolymers of the above ester that can be used in this invention are those derived by addition-type polymerization of the ester (I) as one monomer and at least one monomer (II) containing the group

capable of addition-type (vinyl-type) polymerization.

Examples of monomers (II) include vinyl esters of saturated monobasic acids, specific examples of which include vinyl acetate, vinyl propionate, vinyl butyrate, vinyl laurate, and vinyl stearate; esters of acrylic acid or methacrylic acid with monobasic alcohols containing from 1–18 carbon atoms such as $C_1$-$C_{18}$ alkanols, benzyl alcohol and cyclohexyl alcohol. Specific examples of acrylic acid and methacrylic acid esters include methyl acrylate, methyl methacrylate, ethyl acrylate, ethyl methacrylate, butyl acrylate, butyl methacrylate, 2-ethylhexyl acrylate, 2-ethylhexyl methacrylate, octadecyl, acrylate, and octadecyl methacrylate. Vinyl aromatic hydrocarbons such as styrene, isopropenyl toluene, dimethyl styrene, methyl ethyl styrene, and diethyl styrene can be employed as monomer (II). Other monomers suitable as monomer (II) include acrylonitrile, methacrylonitrile, ethacrylonitrile, acrylamide, methacrylamide, and ethacrylamide.

The polymers employed in this invention will be water-soluble and will have a molecular weight preferably in excess of about 10,000. If the polymers are derived from ester monomer (I) and one or more monomers (II), from about 20% to about 80%, preferably from about 35% to about 65%, of the polymer weight will be attributable to ester monomer (I).

Methods of preparing the addition-type polymers used in preparing the resinous materials of this invention are well known in the art. Any known polymerization initiator of free radical type effective in aqueous medium can be used in preparing the addition-type polymers used in this invention. Specific examples include tertiary hydroperoxide, ammonium persulfate, alkali metal persulfates such as sodium persulfate and potassium persulfate. Also, the initiators can be used with sodium hydrosulfite or other reducing agent in redox systems.

When acrylamide or methacrylamide or the like is used as monomer (II), the precipitation process described in Pat. 3,509,113 can be used to prepare the polymer. The process of Pat. 3,509,113 comprises dissolving the acrylamide type monomer and ester (I) in a solvent and allowing the polymerization to occur to give polymers in readily filterable form. Either a binary solvent or a ternary solvent may be used. The binary solvent is acetone and water and the ternary solvent is acetone, tertiary butanol and water. The amount of acetone in the binary solvent is 30%–70% by weight thereof. The amount of acetone in the ternary solvent is 5%–65% by weight thereof. The amount of tertiary butanol in the ternary solvent is 65%–5% by weight thereof. The polymerization temperature is dependent on the particular initiator used in the system. Temperatures of about 20° C.–65° C. give satisfactory results with potassium persulfate as an initiator in this system.

Epihalohydrin quaternization of the polymer is carried out in an inert liquid medium in which the polymer and the polymer-epihalohydrin reaction product are soluble. The preferred liquid medium is water maintained at a pH of from about 7 to about 9.5. Reaction is carried out at a temperature of from about 30° C. to 80° C. and preferably from about 40° C. to 60° C. The epihalohydrin is used in amounts substantially stoichiometrically equivalent to the tertiary nitrogens of the polymer so that essentially all the tertiary nitrogens of the polymer are converted to quaternary ammonium groups. A slight excess of epihalohydrin (up to about 50%) is recommended so as to insure substantially complete quaternization. Examples of epihalohydrins that can be used in this invention include epichlorohydrin, epibromohydrin, and epiiodohydrin. Dichlorohyrin, which forms epichlorohydrin when dissolved in water having the above pH, can be used if desired. Mixtures of two or more can be used if desired. Epichlorohydrin is the preferred epihalohydrin.

The aqueous solution of polymer-epihalohydrin reaction product ("resin" hereinafter), prepared as above, can be used effectively in the manufacture of wet-strength paper. The resin contains reactive crosslinking groups

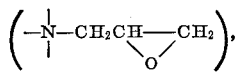

and the resin will usually gel on prolonged standing.

The resin is stabilized against gelation by converting essentially all the reactive

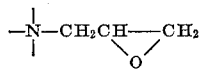

groups to inactive

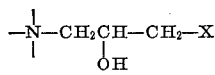

groups, X being the halogen of the epihalohydrin. X will be Cl when the epihalohydrin is epichlorohydrin.

The stabilization is accomplished by adding a water-soluble acid to the resin solution until essentially all the reactive groups are changed to the inactive form. This is accomplished by adding sufficient water-soluble acid to obtain and maintain a pH of from about 1 to 2.7. The reactive groups are thereby changed to the inactive form and the resin solution will be stabilized against gelation. When the pH remains at the desired pH for a period of about 2 hours at room temperature (about 25° C.) it is relatively certain that the pH will not change and the resin solution is stabilized against gelation. By this means, stable solutions having a solids content of from about 10% to about 50% can be prepared. Once this stable condition has been attained, the pH of the solution can be adjusted upward, if desired, to about five without any untoward effect.

Acids that can be employed in the above stabilization procedure are water-soluble acids such as hydrochloric acid, hydrobromic acid, hydrofluoric acid, hydroiodic acid, sulfuric acid, nitric acid, phosphoric acid, acetic acid. Mixtures of two or more water-soluble acids can be used if desired.

Prior to use in the paper mill the resin solutions are "reactivated" by adjusting the pH of the resin solution to and maintaining it above about 8, preferably 10.5 and higher. Preferred pH range is 10.5 to 12. This reconverts essentially all the inactive

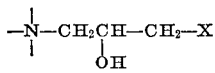

groups to the reactive cross-linking

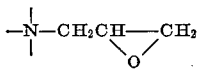

groups. This pH adjustment is made by the addition of a suitable organic or inorganic base such as the alkali metal hyroxides, carbonates, calcium hydroxide, benzyltrimethylammonium hydroxide, and tetramethylammonium hydroxide. The alkali metals include sodium, potassium, cesium and lithium. The base is added preferably as an aqueous solution.

Example 1 below illustrates the preparation of a polymer that can be used to prepare the resinous material of this invention. The method employed is the precipitation method of Pat. 3,509,113.

EXAMPLE 1

Into a 600 cc. reaction vessel there are added 113.2 g. of acrylamide, 62.8 g. of dimethylaminoethylmethacrylate, 265 ml. of deionized water containing 0.1905 g. of potassium persulfate ($K_2S_2O_8$) and 265 g. of acetone. The pH of the resulting solution is about 11 and the pH is subsequently adjusted to about 4 by the careful addition of concentrated hydrochloric acid. Heat is applied to the reaction vessel and the solution therein is heated to a temperature of about 45° C. and essentially maintained at this temperature for a period of time of about 5 hours to provide an acrylamide-dimethylaminoethylmethacrylate polymer. The polymer precipitates out of the liquid medium and is subsequently separated therefrom by filtration and dried.

EXAMPLE 2

Example 1 is repeated using dimethylaminoethylacrylate in place of the dimethylaminoethylmethacrylate.

Examples 3 and 4 below illustrate the preparation of the resinous material of this invention.

EXAMPLE 3

About 4.26 g. of the polymer of Example 1 is dissolved in 195 cc. of water and there is provided a clear viscous solution. The pH of the solution is about 4.1 which is subsequently adjusted to a pH of about 8.5 by the addition of about 7.3 cc. of 1.0 $M$ NaOH. About 0.75 g. of epichlorohydrin is then added to the resulting solution to provide a mixture which is heated to about 50° C. and maintained at this temperature for about 45 minutes. The resulting reaction mass is cooled to room temperature. During cooling some cloudiness of the solution is observed and there is a slight increase in the solution viscosity. The pH of the reaction mass is adjusted to about 5 by the adition of 1 $M$ HCl (about 1.7 cc.). The total solids content of the solution is about 2.5%. This solution is used to prepare the handsheets of Example 5.

EXAMPLE 4

Example 3 is repeated using the polymer of Example 2. The resulting resinous material can be used as a wet-strength agent for paper toweling.

EXAMPLE 5

Rayonier bleached kraft pulp is beaten in a cycle beater to a Schopper-Riegler freeness of 750 cc. Portions of this pulp, adjusted to a pH of about 6.5 with sulfuric acid, are added to the proportioner of a Noble-Wood handsheet forming machine. Samples of the resin of Example 3 are added to the proportioner in an amount of 1% resin solids by weight of pulp solids (dry basis). The pulp is subsequently formed into handsheets of about 40 lb. per sq. ft. basis weight and dried for one minute at a temperature of about 110° C. The resulting handsheets, after conditioning at a temperature of 75° F. and 50% relative humidity for a period of time in excess of 24 hours, are tested for wet tensile strength after soaking for 10 seconds in distilled water. The wet tensile strength of the paper is improved substantially.

The following example illustrates a resinous material of this invention based on a homopolymer of dimethylaminoethylmethacrylate and its use as a wet-strength resin.

EXAMPLE 6

39.3 grams of dimethylaminoethylmethacrylate (DMAEMA) is placed in a beaker and 22.8 g. of 37.5% aqueous HCl is admixed therewith to provide an aqueous solution having a pH of 2. This solution is transferred to a 500 cc. 3-neck reaction vessel fitted with a water condenser, "Y" tube, thermometer, motor driven stirrer, nitrogen sparge, and needle for catalyst delivery (with syringe), together with 2.42 g. of isopropanol and 97 cc. of water. The contents of the reaction vessel are heated to 59–60° C. under nitrogen sparge for about 30 minutes. Subsequently the contents of the reaction vessel are heated to about 80° C. and there is introduced into the flask (via catalyst delivery needle) 0.7 cc. of 0.01 $M$ $FeSO_4 \cdot 7H_2O$ and 2.7 cc. of 89.9% $t$-butyl hydroperoxide. The contents of the reaction vessel are maintained at about 80° C. for about 50 minutes and substantially all the DMAEMA has polymerized to provide a homopolymer thereof. Subsequently the homopolymer solution is cooled to room temperature (about 23° C.) and there is added thereto 104 cc. water. Total solids content of the homopolymer solution is 19.7%. About 75 g. of the above homopolymer solution (contains about 14.8 g. homopolymer) is placed into a 500 cc. reaction vessel fitted with a "Y" tube, water condenser, thermometer, motor driven stirrer, and pH meter. The pH of the solution is adjusted to 8 from 3.5 by adding 5.0 M NaOH (8.0 cc.). Epichlorohydrin, 11.1 g. (8.9 cc.), is added. The resulting mixture is heated slowly to about 68° C. over a period of about 90 minutes during which time the pH thereof is maintained between about 8.6 and about 7.7. The final pH of the solution is about 7.7. At the end of the heating period 419 cc. of water is added to the reaction vessel and the pH of the resulting solution is adjusted to about 1.5 by adding 1.4 cc. of 10 M HCl. Handsheets having good wet-strength properties are prepared by the method of Example 5 using the aqueous solution of the resinous material of this example.

EXAMPLE 7

65.6 grams of a 29.5% aqueous solution of poly(dimethylaminoethylmethacrylate) having an RSV=0.34 is placed in a reaction vessel, heated to about 40° C. and the pH of the solution adjusted from 4.1 to 7.3 by adding 5 cc. of 5 M NaOH. Epichlorohydrin (13.9 grams) (1:1.5 amine:epichlorohydrin mole ratio) and 48.5 cc. water are added to the reaction vessel to give 25% reaction solids. The reaction mixture thus obtained is heated (45° C.–50° C.) for about 103 minutes. The resulting resin solution which has a pH of 7.4, is cooled to room temperature. The resin solution is stabilized against gelation by adding 3.8 cc. of 10 M HCl. The resulting pH is about 2.7. This pH does not change after standing about 2 hours at room temperature. Water is added (439 cc.) to provide a solution of 4.95% resin solids.

EXAMPLE 8

This example illustrates the reactivation of the Example 7 resin solution.

100 grams of the resin solution of Example 7 is diluted to a 3% solids content by the addition of 65 cc. of water. There is added aqueous sodium hydroxide (0.69 gram NaOH dissolved in 50 cc. water), to the solution to adjust the pH to 11.5 and thereby reactivate the resin. The resulting resin solution is used to prepare handsheets having good wet-strength properties.

EXAMPLE 9

Pulp (50:50—Rayonier bleached kraft:Weyerhauser bleached hardwood and kraft) having Canadian Standard Freeness of 500 cc. and a pH of 7.5 is formed into handsheets using the reactivated resin of Example 8 as a wet strength agent in amounts indicated in Table I, based on the pulp dry weight. The handsheets are heated for ½ hour in an oven maintained at about 80° C. to cure the resin. The handsheets are then tested for wet tensile strength after soaking for 10 seconds in distilled water. Test results are set forth in Table I below:

TABLE I

| Percent resin: | Tensile strength—wet lbs./in. |
|---|---|
| 0.25 | 4.25 |
| 0.50 | 5.40 |
| 1.0 | 6.70 |

EXAMPLE 10

100 grams of an 18.7% aqueous solution of poly(dimethylaminoethylmethacrylate·HCl) having an RSV =0.70 is placed in a wide mouth bottle together with 7 cc. of 5 M NaOH and subjected to vigorous agitation. The resulting homogeneous solution, which has a pH of 7.5 is transferred to a reaction vessel. Epichlorohydrin (13.6 grams) is added followed by 41 cc. of water to give 20% reaction solids. The reaction mixture thus obtained is heated (25° C.–33° C.) for about 34 minutes. 389 cc. of water is then added. The pH of the resulting resin solution is adjusted to 2.4 by addition of 6.5 cc. of 10 M HCl. This pH does not change after 2 hours standing at room temperature.

EXAMPLE 11

This example illustrates the reactivation of the Example 10 resin solution.

100 grams of the resin solution of Example 10 is diluted to a 2% solids content by addition of 161 cc. water. There is added aqueous sodium hydroxide (0.76 grams dissolved in 189 cc. water) to give a solution having 1% resin solids and a pH of 11–12. The resulting reactivated resin solution is used to prepare handsheets having good wet-strength properties.

EXAMPLE 12

Example 9 is repeated using the reactivated resin solution of Example 11 except the handsheets are heated for one hour in an oven maintained at about 105° C. Test results are set forth in Table II below.

TABLE II

| Percent resin: | Tensile strength—wet lbs./in. |
|---|---|
| 0.25 | 4.05 |
| 0.50 | 5.10 |
| 1.0 | 5.90 |

As above set forth, quaternization is carried out in an aqueous medium at a pH of from about 7 to about 9.5. The resulting quaternized polymer (resinous material) is thermosettable and will have a plurality of the units

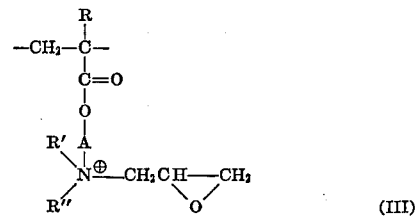

(III)

where R, R', R", A, and X are as above defined.

As above set forth, on acid stabilization, the reactive groups are essentially all converted to their inactive form and the resulting resinous material (which will not be thermosettable and will have a plurality of the units

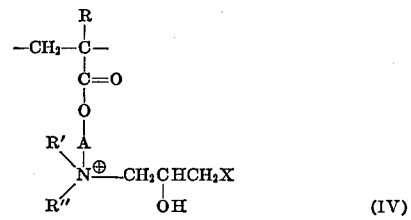

(IV)

where R, R', R", A, and X are as above described.

On reactivation (treatment with base, as above set forth), the formula IV units are reconverted to the formula III units thereby reestablishing the thermosetting properties of the resinous material.

The two perferred embodiments of formula III are as follows:

(a) R is hydrogen; R' is methyl; R" is methyl and A is —$CH_2$—$CH_2$— and (b) R is methyl; R' is methyl; R" is methyl and A is —$CH_2CH_2$—.

It is to be understood that the above description and working examples are illustrative of this invention and not in limitation thereof.

What I claim and desire to protect by Letters Patent is:

1. A method which comprises reacting in an aqueous medium maintained at a pH of from about 7 to about 9.5 and at a temperature of from about 30° C. to about 80° C. (1) an epihalohydrin and (2) an addition-type polymer of an ester monomer of the formula

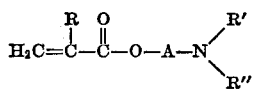

wherein R is hydrogen or methyl; R' is methyl or ethyl; R" is methyl or ethyl; and A is a $C_2$-$C_6$ alkylene having at least 2 carbon atoms between the adjoined oxygen and nitrogen, at least about 20% of the polymer weight being attributable to the ester monomer.

2. The method of claim 1 wherein the addition-type polymer is a copolymer of the ester monomer and at least one other monomer containing the group >C=C< capable of addition type polymerization and the epihalohydrin is epichlorohydrin.

3. The method of claim 1 wherein the addition-type polymer is a homopolymer of the ester monomer and the epihalohydrin is epichlorohydrin.

4. The method of claim 1 wherein the addition-type polymer is a copolymer of dimethylaminoethylmethacrylate and acrylamide and the epihalohydrin is epichlorohydrin.

5. The method of claim 1 wherein the polymer is a homopolymer of dimethylaminoethylmethacrylate and the epihalohydrin is epichlorohydrin.

6. The method of claim 1 wherein, after reaction, the aqueous medium is adjusted to and maintained at a pH of from about 1 to about 2.7.

7. The method of claim 2 wherein, after reaction, the aqueous medium is adjusted to and maintained at a pH of from about 1 to about 2.7.

8. The method of claim 3 wherein, after reaction, the aqueous medium is adjusted to and maintained at a pH of from about 1 to about 2.7.

9. The method of claim 4 wherein, after reaction, the aqueous medium is adjusted to and maintained at a pH of from about 1 to about 2.7.

10. The method of claim 5 wherein, after reaction, the aqueous medium is adjusted to and maintained at a pH of from about 1 to about 2.7.

11. A water-soluble quaternized thermosettable addition-type polymer of an ester monomer, at least about 20% of the polymer weight being attributable to the ester monomer, all the ester monomer units of the polymer being quaternized, said units having the structure

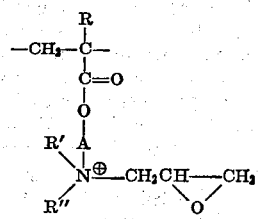

where R is hydrogen or methyl; R' is methyl or ethyl; R" is methyl or ethyl; and A is a $C_2$-$C_6$ alkylene having at least 2 carbon atoms in a chain between the adjoined oxygen and nitrogen.

12. The polymer of claim 11 wherein R' is methyl; R" is methyl; and A is $-CH_2-CH_2-$.

13. The polymer of claim 11 wherein R is hydrogen; R' is methyl; R" is methyl; and A is $-CH_2-CH_2-$.

14. The polymer of claim 11 wherein R is methyl; R' is methyl; R" is methyl and A is $-CH_2-CH_2-$.

References Cited
UNITED STATES PATENTS

| | | | |
|---|---|---|---|
| 2,965,594 | 12/1960 | MacDer | 260—89.5 N |
| 2,838,397 | 6/1958 | Gruntfest | 260—89.5 N |
| 3,026,250 | 3/1962 | Coyner | 260—89.5 N |
| 2,824,861 | 2/1958 | Conbere et al. | 260—89.5 N |
| 3,661,880 | 5/1972 | Markert et al. | 260—89.5 N |
| 3,694,393 | 9/1972 | Lewis et al. | 260—29.6 |

HARRY WONG, JR., Primary Examiner

U.S. Cl. X.R.

117—140, 155, 161; 162—168; 260—29.6 R, 29.6 ME, 85.5 B, 85.5 ES, 85.5 S, 86.7, 88.3 A, 89.5 N